June 14, 1966 R. L. CARVER ETAL 3,256,434
RADIOACTIVITY APPARATUS FOR INDICATING PROPERTIES OF MATERIALS
Filed Nov. 20, 1963 2 Sheets-Sheet 1
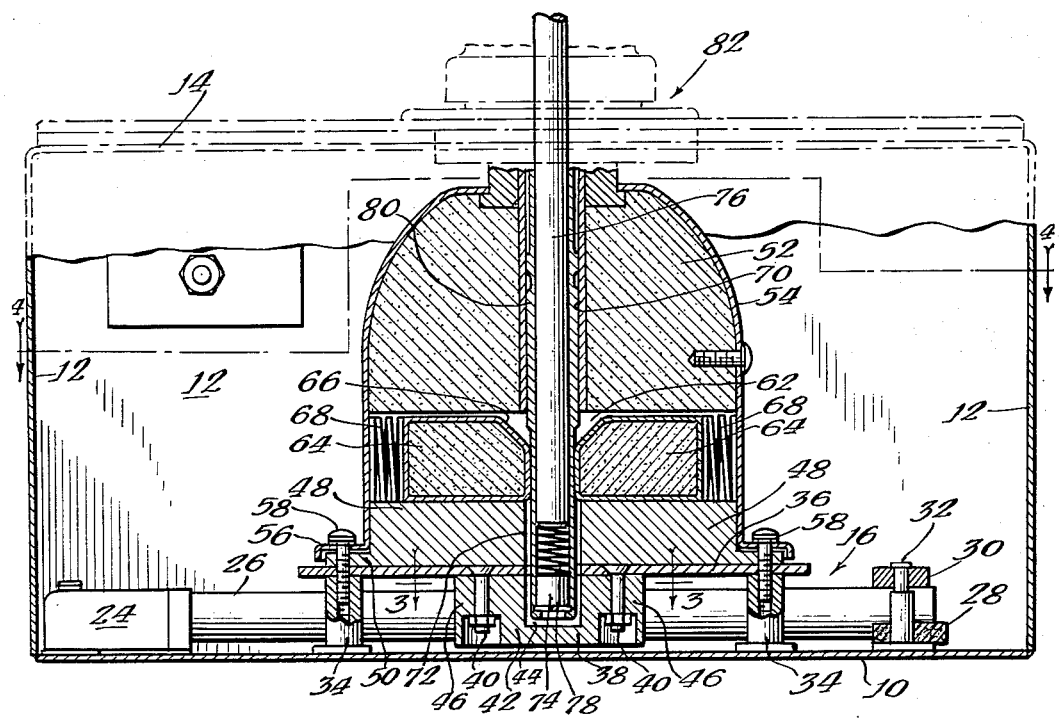
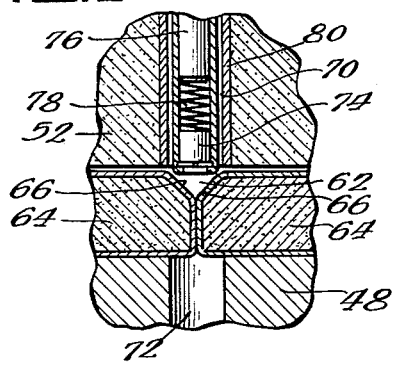
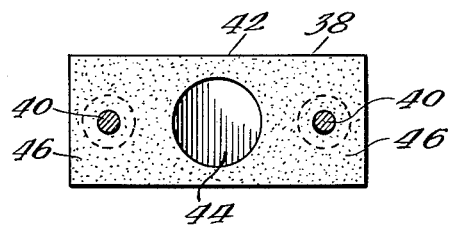
Inventors:
Robert L. Carver
Philip Shevick
By: Stone, Nierman,
Burmeister & Zummer
Attorneys

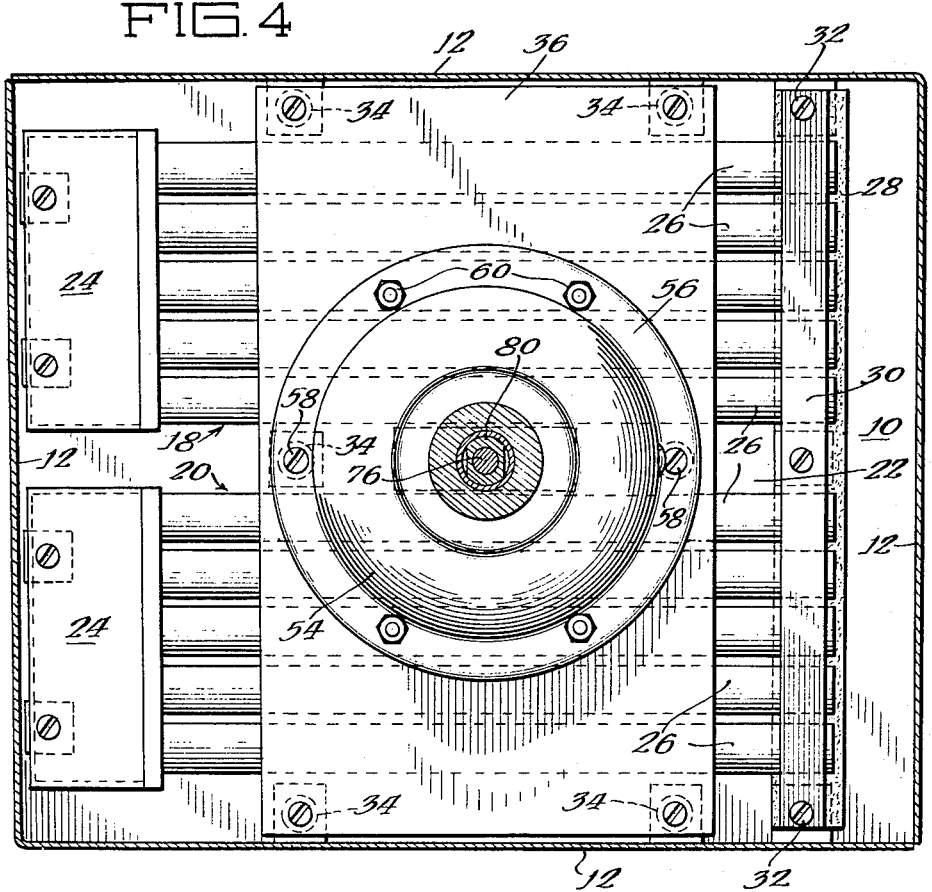
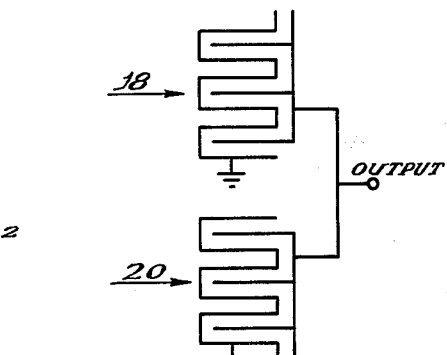

United States Patent Office 3,256,434
Patented June 14, 1966

3,256,434
RADIOACTIVITY APPARATUS FOR INDICATING PROPERTIES OF MATERIALS
Robert L. Carver, Des Plaines, and Philip Shevick, Evanston, Ill., assignors to Nuclear-Chicago Corporation, Des Plaines, Ill., a corporation of Delaware
Filed Nov. 20, 1963, Ser. No. 325,186
22 Claims. (Cl. 250—83.1)

This invention relates to an improved form of portable device for measurement of characteristics of materials, and more specifically to a source-and-detector probe for measurement of moisture content in soils. The present application is a continuation-in-part of the application of the same inventors filed June 17, 1960, Serial No. 36,945, now abandoned.

It has long been known that certain properties of materials may be measured by observing the effect of their presence on the response of a radioactivity detector to a radioactive source. In the copending application of Philip Shevick, Serial No. 741,421, filed June 11, 1958, now Patent 3,103,588, there is described a source-and-detector probe for measurement of moisture in soils, designed to be inserted in a suitable borehole. In many applications, such a probe is not practical, both for the reason that the necessity of drilling boreholes makes the making of measurements over a large area extremely difficult, and the further reason that in many instances only the moisture at the surface of the soil is of direct interest. Thus in order to make this type of instrument practical for many applications, such as road building and agriculture, it is necessary that the probe containing the source and the detector be placed upon the surface under measurement, rather than inserted into a hole made for this purpose. In principle, it would appear that a probe generally similar to that used in depth measurements should also be suitable for surface measurements. In practice, however, this is not true. In the first place, the "geometry" is vastly superior in the borehole measurement to the surface measurement. In the borehole, the probe is completely surrounded by the medium under measurement so that the emissions in all directions (except for the small solid angle longitudinal of the borehole) contribute to the measurement. Further, in the case of such a depth probe, there is little hazard to personnel during use because the only path for exposure to radiation is directly up the borehole, the soil itself serving as a shield in all other directions.

It is found that the employment of a construction analogous to that employed in the depth probes is incapable of producing a fully practical instrument for surface measurements of moisture. In both types of measurements, of course, the lower limit of intensity of the neutron radiation which may be employed is fixed by the necessity of obtaining counting rates which will produce reasonably low statistical errors without excessive measurement times. It is of course possible to compensate for the loss of the favorable geometry obtained in using a depth-type probe in a surface application by increasing the size of the source. However, such a modification is found to be highly impractical; because of the loss of the shielding inherent in borehole measurements, the surface measurement must in general be performed with a source less, rather than more, intense than the borehole measurement. The problem is particularly acute where the source, in addition to the neutrons actually employed, emits a high proportion of gamma rays, as in the case of radium-beryllium sources.

A further problem in design of a satisfactory surface moisture probe is the matter of linearity of calibration, i.e., linear variation of detector counting rate with moisture content over the range of interest, which is, in the case of said measurements, from zero to 50% moisture in the soil.

It has thus been found that although the prior art suggests the possibility of moisture measurements on soil surfaces by neutron emission and detection, and indeed presents at least one probe as suitably designed for the purpose, the reaching of a probe design which will, as a practical matter, be accepted for routine use in making such measurements in the field, in substitution for other methods and apparatus for such measurements, requires highly specialized design features in order that the measurements may be made safely in a reasonably short time and without impairing linearity of calibration or making the device so cumbersome that it becomes impractical as a portable instrument.

These features of construction, which have been found by the present applicants to produce a commercially practical instrument, may be understood from the description of a particular embodiment of the invention which is illustrated in the attached drawing.

In the drawing:

FIGURE 1 is a vertical sectional view of a source-and-detector probe for soil moisture measurements made in accordance with the invention;

FIGURE 2 is a fragmentary sectional view corresponding to a portion of FIGURE 1, but illustrating the parts in a different position.

FIGURE 3 is an elevational view partially in section taken along the line 3—3 of FIGURE 1 in the direction indicated by arrows, of a shield cup or sleeve constituting a portion of the device of the invention;

FIGURE 4 is a horizontal sectional view taken along the offset line 4—4 of FIGURE 1 in the direction indicated by arrows;

FIGURE 5 is a more or less diagrammatic plot or graph illustrating certain aspects of the operation of the device of the invention; and FIGURE 6 is a more or less fragmentary schematic illustration of the electrical connection of detectors employed in the probe.

The illustrated source-and-detector probe construction is enclosed in a housing having a bottom 10, sidewalls 12, and a top 14. On the bottom 10, which is transparent to neutrons of all energies, being made of, for example, 11 gauge aluminum, there is mounted an array of detectors generally designated by the numeral 16. The array is formed of two groups of detectors 18 and 20, parallel with each other and spaced by a small central gap 22. Each group of detectors has a header box or cover 24, from which extend five parallel tubular portions 26. Each group 18 and 20 is internally parallel-connected and the two groups are likewise connected in parallel (FIGURE 6). The detectors are, for example, cylindrical boron trifluoride proportional counters having the well-known inverse proportionality between sensitivity and neutron velocity. (The construction of the individual detectors is not herein described in detail, constituting no portion of the invention herein disclosed and claimed. For the purposes of the present invention in its broadest aspects, any type of slow neutron detector may be employed to form the detector array.) In the present embodiment, one end of the tubular counters 26 terminates in the corresponding header 24, which is secured to the bottom 10, and the opposite end rests on a resilient support 28, all of the outer ends being positioned by a clamp bar 30 secured by screws 32. Spaced from the bottom 10 by posts 34 of sufficient height to clear the detector array 16 is a support plate 36. A shield cup 38 is secured to the under side of the support plate 36 at the center by bolts 40, the shield cup being disposed in the gap 22 between the detector groups 18 and 20 forming the array.

The shield cup 38, of lead, has a sleeve portion 42 absorbing horizontal gamma radiation and a bottom portion 44 absorbing downward gamma radiation (but transparent to neutrons), extension portions 46 being provided to facilitate the bolted fastening. The dimensioning and purpose of the shielding portions of the cup 38 will be discussed further hereinafter.

A fast neutron reflector 48, in the form of a disc of copper, and having a flange at 50, rests on the support plate 36. On the reflector 48 is a more or less hemispherical gamma ray shield 52. A cover or sheath 54 provided with a flange 56 mating with the flange 50 covers the shield and reflector and holds them in position, the entire assembly being secured in place by bolts 58 and 60. As more fully described in the copending application of Raymond L. Meeder and Charles E. Mielke, filed January 5, 1960, Serial No. 617, now U.S. Patent No. 3,126,484, the under side of the shield 52 has a diametric channel 62 in which are slidable shield blocks 64 with upwardly facing cam surfaces 66, the slide blocks 64 being biased inwardly by springs 68 to the positions shown in FIGURE 2, wherein they meet. The shield 52 has an axial aperture 70 in register with a central aperture 72 in the reflector. A source capsule 74 containing a radium-beryllium source and a rod 76 returning the capsule 74 in position by means of a spring 78 are all encased in a hollow rod or tube 80, the vertical manipulation of which selectively raises the source into the shield with the slide blocks closed as in FIGURE 2, or drops the source into the cup 38 for the making of a measurement, as in FIGURE 1. The tube 80 is provided with camming and locking surfaces cooperating with a locking hub structure 82 which is not fully described herein, being fully described in the copending application last mentioned.

The general structure of the device of the invention having been described, the manner of operation and the criticality of the selection of materials and dimensions may be now understood. The practicality of such a device for field use, as may be seen from the earlier discussion, has four essential requirements, any one of which is fairly easily obtainable, but the combination of which has been found to be obtainable over only a relatively small range of variables in construction. These four factors may be summarized as (1) neutron utilization (2) linearity of calibration over the range of interest in soil measurement (3) light weight and portability and (4) low external radiation at exterior points other than the bottom. As may readily be seen, although these four factors would be of importance even with a pure neutron emitter, such as a polonium-beryllium neutron source, the latter two become even more critical when using a radium-beryllium neutron source, because the presence of gamma rays both lowers the maximum neutron source strength which can be used and lowers the permissible weight of the components actually contributing to the measurement, because of the necessity for the presence of shielding for gamma rays in both the storage and operating conditions.

The fast neutron reflector must have a high ratio of macroscopic scattering cross-section to weight. It is found that copper demonstrates the most desirable properties as the reflector for use in the device of the present invention. The thickness of the copper should be between one-half and one inch, three-quarters of an inch being found highly satisfactory. The optimum diameter (i.e., neglecting the thin flange) is found to be from 4 to 4½ inches, further increase of diameter producing no adequate increase in neutron utilization to justify the added weight.

The overall size of the housing is approximately 10″ x 12″ in the horizontal plane, with a 6″ height. However, the actual effective area covered by the neutron detector array is approximately 7¾″ square (the sensitive portion of the length of the detector illustrated). It is found that with horizontal dimensions smaller than approximately 6″ the neutron utilization is adversely affected to an excessive degree, while with horizontal dimensions greater than approximately 8″ square, the linearity of calibration in the range of interest in soil measurements is adversely affected, the reasons for these experimentally observed limitations being discussed later. It will of course be understood that the reflector dimensions referred to previously, as regards horizontal extension, are for use with an array of neutron detectors of the dimensions just stated, the horizontal extension dimensions of the reflector over the central portion of the detector array being half to three quarters the dimensions of the array.

The shield cup 38 serves a multiple purpose. The sleeve portion 42 absorbs sufficient gamma radiation to prevent the slow neutron responsive proportional counters constituting the detectors of the array from producing spurious counts due to high-intensity gammas. The bottom portion 44 acts to attenuate the downward gamma radiation. It will be noted that the housing is so shaped that the distance from the source to the exterior of the housing (except in the downward direction) when the source is in the lowered position is at least equal to the distance of the source from the closest sidewall, thus reducing gamma flux to safe levels without the necessity of shielding of the magnitude provided in the withdrawn or storage position of the source. It is also to be noted that the copper neutron reflector provides a substantial degree of shielding of low upward angle gamma radiation because of the thickness of the copper which must be traversed by gamma rays leaving the source at the small upward angles exterior to the solid angle subtended by the gamma-ray shield when the source is in the lowered position. With the present construction (see FIGURE 1) the reflector 48 presents a very large thickness to the gamma rays from the source, and the only direction (other than the safe downward direction) in which the gamma attenuation is limited to the thickness of the shielding sleeve 42 (about ⅛″ of lead) is substantially horizontal, at which there exists negligible hazard of radiation damage to personnel when the probe is in working position on the surface of the ground.

The device illustrated in the drawing and described above presents a safe and practical source-and-detector probe for surface measurements of characteristics of materials, particularly for the measurement of moisture in surface soils. Using a 4 to 5 milligram radium-beryllium source, the illustrated construction is extremely linear in counting rate as a function of moisture contents of soil from 2% to 40% with an increment of approximately 300 counts per minute per percent volume of moisture, small departures from linearity occurring in the infrequently-encountered extremely low and extremely high soil moisture contents at the bottom and top of the overall range. With the probe in the operating condition resting on the ground, maximum radiation at the outer surfaces of the housing at upward angles more than a few degrees is 10 mr. per hour or less.

It will of course be understood that the description of materials herein used follows the practice customarily used in the art. Thus, for example, lead is considered a gamma-ray shielding material and copper or iron a fast-neutron-reflecting material despite the fact that the former will have some degree of efficiency in reflecting neutrons and the latter in absorbing gamma rays. For purposes of the present invention, a fast neutron reflector is a material having negligible neutron absorption and moderation and having a macroscopic scattering cross-section of at least 0.1/cm., for neutrons at the energy of emission from the source and a gamma ray shielding material is a material having gamma ray absorption properties at least substantially equivalent to those of lead.

As was previously observed, the detecting area is selected to produce high counting rates with any given intensity of the neutron source while providing substantial linearity of the moisture response curve over the range to be measured. The manner in which this object is achieved can best be understood by consideration of the counting rates of individual counters, and their aggregate.

As shown in the Shevick patent previously mentioned, it is possible to obtain substantial linearity of response over a wide range in soil moisture measurements of the depth type by placing the source directly adjacent to the counter at its longitudinal center, with proper selection of the length of the counter. It will be observed that either of the innermost counters 26 of the present device is in a relationship to the source which is approximately analogous to the same type of source-and-detector geometry as is used in a depth probe. In a surface measurement, however, there are a number of factors which make the desirable constructional features substantially different in producing high source utilization with good linearity of calibration. There has already been discussed the use of the reflector to utilize, at least in part, the neutrons emitted by the source in upward directions, thus reducing this type of loss, which is not encountered in depth measurements. In addition to the fast neutrons emitted directly from the source, the reflector also helps to conserve partially moderated neutrons which escape from the medium under measurement (the device itself of course being substantially free of moderating material) before they have reached sufficiently low energy to be detected by the thermal neutron detectors. Nevertheless, the overall geometry is found, whether with or without a reflector, such as to make the use of a source and single detector (or detectors on each side of the source) as used in depth measurements completely unsatisfactory for surface measurements, both as regards source utilization and as regards linearity of the moisture calibration curve. By spacing a counter (or counters) substantially from the source, rather than closely adjacent, it is found to be possible to achieve a fair degree of linearity of calibration, but at the expense of still further loss of counting rates for any given source size.

FIGURE 5 illustrates, in slightly idealized and simplified form, the general principle of the manner in which linearity is achieved in the large-area detector geometry of the invention along with great gain in source utilization. For purposes of simplicity, this figure shows only the individual counting rates of two of the counters on one side of the source, the responses being idealized to some degree in order to illustrate the principle most clearly.

The shape of the detector response curve, in any source-and-detector radioactivity measuring device for properties of materials of the present general type, will be greatly affected by the distance between the source and the detector, where the variable under measurement has both an effect on the scattering and an effect on absorption, as is normally the case. It has long been known that a fast neutron source and a slow neutron detector will produce a calibration curve for variations in moisture which has a shape highly dependent upon the spacing used and the particular range of moisture content (or similar variable) under measurement. Typically, departures from linearity are characterized by a second derivative which is positive at low values of moisture and negative at high values of moisture, even though the counting-rate is an increasing function of moisture over the entire range.

In the surface measurement here involved, with extremely small spacings between source and detector, the first region of the curve extends to the highest moisture concentration values of interest in soil measurements, so that the entire portion of the moisture response curve which is used is concave upward, as shown in FIGURE 5 for the case of the inner counter, the response curve of which is indicated at 90. At much larger spacings, this first portion of the curve is not measurable, occurring over a very small range of moisture concentrations close to zero, the gross calibration curve accordingly demonstrating only the negative second derivative, such a curve being illustrated at 92. Such curves are found to be dependent not only upon the perpendicular spacing from the source, but also, in the case of a straight elongated counter, upon the length.

By proper selection of parameters, the counters and differing distances may be so selected that the non-linearities of the characteristic curves are in opposite and compensatory directions, so that when the two are connected in parallel, their total counting rate has much greater linearity than the individual counting rate of one of the counters. This is graphically illustrated in FIGURE 5, which is drawn to idealize the operation in illustration of the principle, the curves 90 and 92 producing, when totalled, the straight-line characteristic or response curve 94. There is also shown in the drawing the dotted "normalized" curve or line 96, corresponding to half the ordinate values of the straight-line plot 94.

As will be obvious, the idealized graph of FIGURE 5 represents the results obtained when there are added the responses of counters which are respectively too near to, and too far from, the source to give the best linearity. When these are added to a counter of intermediate spacing from the source, selected for best linearity over the range of moistures to be measured as was done prior to the present invention, it is seen that both the linearity and the source utilization have been greatly benefited. Such compensatory "response shaping" represents in the ultimate the overall principle of the present construction, which closely approximates an entire thermal-neutron-detecting area, with the fast neutron source at its center.

It will of course be understood that the achievement of exact linearity with the accuracy portrayed in FIGURE 5 is not practical. Compensation or cancellation of the opposite non-linearities in measured curves cannot be practically achieved without leaving minor "ripples" in the overall curve. However, the present construction not only does not sacrifice linearity as the price of increased utilization of the source by adding further counters to a single counter at optimum distance, but indeed produces, over a broad range of moisture values, a lower deviation from exact linearity than can be achieved with a single counter.

Although herein illustrated in a particular application, the principle of mutual compensation or self-cancellation of non-linearities of response, while at the same time multiplying the utilization of a source of any given intensity, can be adapted to many other source-and-detector geometires for measurements of properties of materials. In general, even where the highest degree of source utilization is not a requirement, the response curve of any given detector may be linearized by adding at least one other detector connected in parallel, and having in itself a detector output having an opposite direction of curvature to the non-linear curvature of the first. Since the general overall theory is not necessarily limited to neutrons, but extends to other measurements in which oppositely-curved non-linear responses can be obtained by adjustment of detector spacing, length, etc., there are many other applications, particularly of an industrial or semi-industrial nature, in which linearity of response can advantageously be achieved in this general manner. Obviously utilization of this construction is not limited to identical counters, as here used. Nor is it necessary that the addition of counter outputs be made by simple connection in parallel, so long as the outputs vary in the same direction, but with opposite curvatures (i.e., have first derivatives of the same sign, but second derivatives of opposite sign) over the portion of the range to be linearized.

It will also be understood that particular features of the invention may be employed independently of others, depending upon the requirements and purposes of the particular radioactivity device being designed, many of the features described being adaptable to radioactivity devices for purposes other than that herein described, particularly to surface probes for measuring the properties of materials other than the moisture contents of soils. It will likewise be understood that a substantial amount of variation in the particular construction described and illustrated is permissible without departing from the teachings of the invention. Accordingly, the scope of the invention is not necessarily limited to the particular embodiment herein shown, but is to be determined from the appended claims.

What is claimed is:

1. A radioactivity source-and-detector device for measurement of properties of materials comprising a radioactivity source and radioactivity detectors, having means for supporting said source and detectors closely adjacent to a material under measurement, variation in the measured property producing variation in the response of the detectors produced by the net effect of change in the same direction of absorption and scattering characteristics of the material, and having:
   (a) a plurality of detectors each having response curves varying in the same direction with variation of the property under measurement over at least a portion of the range under measurement,
   (b) at least two of the respective detectors being constructed and located to have the relative effects of absorption changes and scattering changes thereon sufficiently different to produce oppositely curved non-linear response characteristic curves over the range to be measured, and
   (c) such detectors being electrically connected in parallel to produce an overall output characteristic more linear than that of either of such detectors.

2. The device of claim 1 wherein the source is a fast neutron source and the detectors are thermal neutron detectors.

3. The device of claim 1 wherein all the detectors are elongated and closely spaced in side by-side relation to form a substantially continuous sensitive detecting area.

4. The device of claim 3 wherein the source is centered in the detecting area.

5. The device of claim 1 wherein the detectors are substantially identical in all respects other than distance from the source.

6. A neutron source-and-detector device for measurement of moisture content and analogous properties of materials comprising:
   (a) a fast neutron source,
   (b) at least two thermal neutron detectors at differing distances from the source,
   (c) both of said neutron detectors having response curves varying in the same direction with variation of the property under measurement over at least a portion of the range of measurement,
   (d) one of said detectors being sufficiently close to the source to produce a response curve concave upwardly and the other being sufficiently far from the source to produce a response curve concave downwardly, said response curves thus being of opposite non-linear curvature in said portion of said range,
   so that the non-linearity of the total detector output response in said portion of the range is smaller than the non-linearity of the output response of either detector.

7. In a portable device for measurement of the characteristics of materials, a plane array of detectors responsive primarily to low-energy neutrons, said array having substantially equal dimensions in its plane, a plane fast neutron reflector closely adjacent and parallel to the central portion of the array and having dimensions in its plane from half to three quarters the corresponding dimensions of the array, and a fast neutron source in the center of the array.

8. The device of claim 7 wherein the reflector is of copper.

9. A portable device for measurement of moisture content in soil comprising the device of claim 7 wherein the detectors form an area from 6 to 8 inches in each direction, the energy characteristic of the neutron source being substantially that of radium-beryllium.

10. The device of claim 7 having a neutron-transparent housing, the array being on the bottom thereof and the housing having all exterior portions other than the bottom spaced from the source by a distance at least equal to half the dimension of the array.

11. In a device for measurement of the characteristics of materials, a flat-bottomed housing, an array of detectors responsive primarily to low-energy neutrons substantially covering the bottom of the housing, a centrally apertured fast neutron reflector above the detector array, a gamma-ray shield above the reflector having a passage in the bottom in alignment with the aperture in the reflector, a gamma-emitting fast neutron source in the shield, means to move the source out of the shield through the passage and aperture and into the central portion of the array for the making of a measurement, and a gamma ray attenuator substantially transparent to neutrons surrounding the source in said central portion of the array.

12. In a device for measurement of the characteristics of materials, a flat-bottomed housing, an array of detectors responsive only to low-energy neutrons substantially covering the bottom of the housing, a centrally apertured fast neutron reflector immediately above the detector array, a gamma-ray shield above the reflector having an exit passage in alignment with the aperture in the reflector, the detector array having a gap in alignment with said passage and aperture, a gamma-emitting neutron source in the shield, and means to move the source out of the shield through the passage and aperture and into the gap for the making of a measurement.

13. A portable radioactivity device for the measurement of surface characteristics of materials comprising a housing having a neutron-transparent bottom, a lead shield in the central portion of the housing, a plurality of slow neutron detectors on the bottom of the housing defining a detecting area, a copper neutron reflector immediately above the central portion of the detecting area and below the shield and having an aperture therein, a gamma-emitting fast neutron source, a gamma-ray shielding sleeve adapted to receive the source in the central portion of the detecting area, and means for moving the source from the shield through the aperture in the reflector into the shielding sleeve for the making of a measurement on a surface upon which the housing is placed.

14. A portable radioactivity device for the measurement of surface characteristics of materials comprising a housing having a neutron-transparent bottom, a lead shield in the central portion of the housing, a plurality of slow neutron detectors on the bottom of the housing defining a detecting area, a copper neutron reflector immediately above the portion of the detecting area extending from one-half to three-quarters the transverse dimension thereof and having a central aperture therein, a gamma-emitting fast neutron source, a gamma-ray shielding sleeve adapted to receive the source in the central portion of the detecting area, and means for moving the source from the shield through the aperture in the reflector into the shielding sleeve for the making of a measurement on a surface upon which the housing is placed.

15. A portable radioactivity device for the measurement of surface characteristics of materials comprising a lead shield, a plurality of slow neutron detectors in a plane defining a detecting area, a fast neutron reflector between and immediately adjacent to the central portion of the detecting area and the lead shield, a gamma-emitting fast neutron source, and a lead shielding sleeve containing the source in the central portion of the detecting area.

16. A radioactivity device for the measurement of surface characteristics of materials comprising a housing having a neutron-transparent bottom, a lead shield in the central portion of the housing, a plurality of slow neutron detectors on the bottom of the housing defining a detecting area, a copper neutron reflector immediately above the central portion of the detecting area and having an aperture therein, a gamma-emitting fast neutron source, a gamma-ray shielding sleeve adapted to receive the source in the central portion of the detecting area, and means for moving the source from the shield through the aperture in the reflector into the shielding sleeve for the making of a measurement on a surface upon which the housing is placed.

17. A radioactivity device for measurement of surface characteristics of materials comprising detector means defining a thin detecting area sensitive to slow neutrons and of lateral dimensions large compared to its thickness, a fast neutron reflector closely adjacent to one side of said area and also of lateral dimensions large compared to its thickness, a gamma-ray shield on the side of the neutron reflector opposite the detecting area, and a gamma-emitting fast neutron source in the center of the detecting area and closely adjacent to the reflector, the gamma-ray shield subtending a substantial solid angle of radiation from the source, whereby the reflector increases the utilization of neutrons in measurements on a surface while constituting an absorber of effective thickness much greater than its actual thickness for shielding backwardly emitted gamma-rays exterior to the solid angle subtended by the gamma-ray shield.

18. A source and shield assembly for unidirectional neutron exposure comprising a gamma-emitting neutron source, a fast neutron reflector of lateral dimensions large compared to its thickness having its center adjacent to the source, and a gamma-ray shield on the opposite side of at least the center of the neutron reflector and subtending a substantial solid angle of radiation from the source, whereby neutrons are reflected forward, gamma rays emitted at large backward angles are adsorbed by the shield, and gamma rays emitted at small backward angles are absorbed by the large effective thickness of neutron reflector thus encountered.

19. A radioactivity device for the measurement of moisture content of materials comprising a moderator free plane array of closely spaced side-by-side neutron detectors of sensisivity substantially inversely proportional to neutron velocity forming a detecting area of dimensions of from 6 inches to 8 inches in each direction in the plane, and a fast neutron source at the center of the array.

20. The device of claim 19 wherein the neutron source is alpha-activated beryllium and the detectors are boron-trifluoride counters.

21. A radioactivity device for the measurement of moisture content of soils and the like comprising detecting means forming a moderator-free plane neutron detection area of sensitivity substantially inversely proportional to neutron velocity, the effective dimensions of the area in both directions being from 6 inches to 8 inches, and a fast neutron source at the center of the detection area, the overall response of the detecting means being a substantially linear function of moisture content over the range from 2% to 40% in soils and like materials against which the source and detecting means are placed.

22. A radioactivity source-and-detector device for measurement of properties of materials comprising a radioactivity source and radioactivity detectors, having means for supporting said source and detectors closely adjacent to a material under measurement, variation in the measured property producing variation in the response of the detectors produced by the net effect of the change in the same direction of absorption and scattering characteristics of the material, and having:
  (a) a plurality of detectors each having response curves varying in the same direction with variation of the property under measurement over at least a portion of the range under measurement,
  (b) at least two of the respective detectors being constructed and located to have the relative effects of absorption changes and scattering changes thereon sufficiently different to produce oppositely curved non-linear response characteristic curves over the range to be measured, and
  (c) means for adding the outputs of the detectors to produce an overall output characteristic which is more linear than that of either of such detectors.

References Cited by the Examiner
UNITED STATES PATENTS

| | | | |
|---|---|---|---|
| 2,499,311 | 2/1950 | Herzog et al. | 250—83.1 |
| 2,556,768 | 6/1951 | McKibben | 250—83.1 |
| 3,009,062 | 11/1961 | Brooksbank | 250—83.1 |

RALPH G. NILSON, *Primary Examiner.*

A. R. BORCHELT, *Assistant Examiner.*